United States Patent
Wu

(10) Patent No.: US 9,961,659 B2
(45) Date of Patent: May 1, 2018

(54) METHOD OF HANDLING FREQUENCY DE-PRIORITIZATION

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 14/062,918

(22) Filed: Oct. 25, 2013

(65) Prior Publication Data

US 2014/0120915 A1 May 1, 2014

Related U.S. Application Data

(60) Provisional application No. 61/718,201, filed on Oct. 25, 2012, provisional application No. 61/721,034, filed on Nov. 1, 2012.

(51) Int. Cl.
| | |
|---|---|
| *H04W 60/04* | (2009.01) |
| *H04W 76/02* | (2009.01) |
| *H04W 48/16* | (2009.01) |
| *H04W 48/18* | (2009.01) |

(52) U.S. Cl.
CPC .......... *H04W 60/04* (2013.01); *H04W 48/16* (2013.01); *H04W 76/028* (2013.01); *H04W 48/18* (2013.01)

(58) Field of Classification Search
CPC ............................ H04W 76/028; H04W 60/04
USPC ................... 455/453.3, 512, 513, 525, 435.2
See application file for complete search history.

(56) References Cited

U.S. PATENT DOCUMENTS

| | | | | |
|---|---|---|---|---|
| 8,731,477 B2* | 5/2014 | Ekici | ..................... | H04W 24/02 370/252 |
| 2011/0317552 A1* | 12/2011 | Lee | ..................... | H04L 27/2601 370/228 |
| 2013/0303173 A1* | 11/2013 | Hole | ..................... | H04W 36/36 455/437 |
| 2013/0303176 A1* | 11/2013 | Martin | ................ | H04W 76/027 455/450 |

OTHER PUBLICATIONS

3GPP TSG-RAN WG2 Meeting #79, R2-124576, NW failure and UE reselection, Aug. 13, 2012.*
European patent application No. 13020123.9, European Search Report dated Feb. 20, 2014.
Nokia Corporation, Nokia Siemens Networks, Vodafone, "NW failure and UE reselection", 3GPP TSG-RAN WG2 Meeting#78, R2-122530, Prague, Czech Republic, May 21-25, 2012, XP050606963, p. 1-6.

(Continued)

*Primary Examiner* — Kashif Siddiqui
(74) *Attorney, Agent, or Firm* — Winston Hsu

(57) ABSTRACT

A method of handling frequency de-prioritization for a communication device in a wireless communication system is disclosed. The method comprises receiving a first Radio resource control (RRC) connection reject message with a first deprioritization request indicating at least one first carrier frequency to be the lowest priority frequency, from a first public land mobile network (PLMN) of the wireless communication system, and determining the at least one first carrier frequency to be the lowest priority frequency only when the communication device selects or registers to the first PLMN.

18 Claims, 3 Drawing Sheets

(56) References Cited

OTHER PUBLICATIONS

Renesas Mobile Europe Ltd, "Redirection/Reselection on RRC Connection Reject", 3GPP TSG-RAN WG2 Meeting #78, R2-122609, Prague, Czech Republic, May 21-25, 2012, XP050607051, p. 1-4.

Nokia Siemens Networks, Nokia Corporation, Alcatel-Lucent, Ericsson, ST Ericsson, Verizon, Vodafone, Intel Corporation, MediaTek Inc, Qualcomm Incorporate, LG Electronics Inc., "RAN overload handling using RRC Reject", 3GPP TSG-RAN WG2 Meeting #79bis, R2-125164, Bratislava, Slovakia, Oct. 8-12, 2012, XP050666864, p. 1-2.

Alcatel-Lucent, Nokia Siemens Networks, Nokia Corporation, Ericsson, ST Ericsson, Verizon, Vodafone, Intel Corporation, MediaTek Inc, Qualcomm Incorporate, LG Electronics Inc, "RAN overload handling using RRC connection Rejection", 3GPP TSG-RAN WG2 Meeting #79bis, R2-125163, Bratislava, Slovakia, Oct. 8-12, 2012, XP050666819, p. 1-5.

ETSI MCC, "Draft Report of 3GPP TSG RAN WG2 meeting#79bis, Bratislava, Slovakia, Oct. 8-12, 2012", 3GPP TSG-RAN Working Group 2 meeting#80, R2-12xxxx, New Orleans, Nov. 12-16, 2012, XP050666925, p. 1-142.

3GPP TS 24.301 V11.4.0 3rd Generation Partnership Project; Technical Specification Group Core Network and Terminals; Non-Access-Stratum (NAS) protocol for Evolved Packet System (EPS); Stage 3 (Release 11), Sep. 2012.

3GPP TSG-RAN WG2 Meeting #79bis, R2-125163, RAN overload handling using RRC connection Rejection, Oct. 8, 2012.

3GPP TSG-RAN WG2 Meeting #79bis, R2-125164, RAN overload handling using RRC Reject, Oct. 8, 2012.

\* cited by examiner

METHOD OF HANDLING FREQUENCY DE-PRIORITIZATION

CROSS REFERENCE TO RELATED APPLICATIONS

This application claims the benefit of U.S. Provisional Application No. 61/718,201, filed on Oct. 25, 2012 and entitled "Method and Apparatus for handling frequency de-prioritization in a wireless communication system", and Application No. 61/721,034, filed on Nov. 1, 2012 and entitled "Method and Apparatus for handling frequency de-prioritization in a wireless communication system", the contents of which are incorporated herein in their entirety.

BACKGROUND OF THE INVENTION

1. Field of the Invention

The present invention relates to a method used in a communication device in wireless communication system, and more particularly, to a method of handling frequency de-prioritization.

2. Description of the Prior Art

Based on 3GPP specification of Radio Resource Control (RRC) protocol, when a user equipment (UE) receives the RRCConnectionReject message including a parameter, deprioritisationTimer, the UE shall start or restart timer t325 with the timer value set to the deprioritisationTimer signaled. deprioritisationTimer indicates the period for which the signalled carrier or E-UTRA is deprioritized, with a value in minutes.

In addition, the UE shall store another parameter, deprioritisationReq, included in RRCConnectionReject message, until t325 expiry, irrespective of any other cell reselection absolute priority assignments (by dedicated or common signalling), or RRC connections in Evolved Universal Terrestrial Radio Access Network (E-UTRAN) or other radio access technologies (RATs). The deprioritisationReq contains "frequency" indicating a currently used carrier frequency is deprioritized in cell reselection or contains RAT, e.g. "e-utra" indicating all frequencies of E-UTRA are deprioritized in cell reselection. If another deprioritisationReq is received before t325 expiry, the UE shall be able to store 8 deprioritisationReq.

Moreover, based on 3GPP specification of User Equipment (UE) procedure in idle mode, in cell reselection evaluation process, if the UE receives RRCConnectionReject message with deprioritisationReq, the UE shall consider current carrier frequency and stored frequencies due to the previously received RRCConnectionReject message with deprioritisationReq or all the frequencies of E-UTRA to be the lowest priority frequency while t325 is running irrespective of camped RAT.

Absolute priorities of different E-UTRAN frequencies or inter-RAT frequencies may be provided to the UE in the system information, in the RRCConnectionRelease message, or by inheriting from another RAT at inter-RAT cell (re) selection. In the case of system information, an E-UTRAN frequency or inter-RAT frequency may be listed without providing a priority (i.e. the field cellReselection-Priority is absent for that frequency). If priorities are provided in dedicated signalling, the UE shall ignore all the priorities provided in system information. If UE is in "camped on any cell" state, UE shall only apply the priorities provided by system information from current cell, and the UE preserves priorities provided by dedicated signalling unless specified otherwise. When the UE in "camped normally" state has only dedicated priorities other than for the current frequency, the UE shall consider the current frequency to be the lowest priority frequency (i.e. lower than the eight network configured values). While the UE is camped on a suitable CSG cell, the UE shall always consider the current frequency to be the highest priority frequency (i.e. higher than the eight network configured values), irrespective of any other priority value allocated to this frequency.

However, there is a problem associated with deprioritisationReq at public land mobile network (PLMN) change. The PLMN may have several RATs (e.g. Universal Mobile Telecommunications System (UMTS) and Long-Term Evolution (LTE)). An operator can be identified by a PLMN code, which consists of a Mobile Network Code (MNC) and Mobile Country Code (MCC) pair. In the prior art above, the UE stores the deprioritisationReq received from a first PLMN until t325 expiry, irrespective of any other cell reselection absolute priority assignments (by dedicated or common signalling), or RRC connections in E-UTRAN or other RATs. When the UE camps on a second PLMN, the UE may still de-prioritize a frequency of the first PLMN where the UE receives the deprioritisationReq in the RRCConnectionReject message if t325 does not expires. If the frequency is also used by the second PLMN and the second PLMN prefers the UE to camp on that frequency using configuration broadcast by system information, the UE cannot follow the configuration of the second PLMN until t325 expires. This makes the second PLMN cannot efficiently control the UE performing cell reselection. For example, the UE would be unable to get LTE service if the second PLMN can provide the LTE service since the frequency(s) for the LTE service may be unfortunately de-prioritized when the UE was in UMTS service providing by the first PLMN previously. Therefore, there is a need to solve the above problems.

SUMMARY OF THE INVENTION

It is there for an objective to provide a method of handling frequency de-prioritization to solve the above problems.

The present invention discloses a method of handling frequency de-prioritization for a communication device in a wireless communication system. The method comprises receiving a first Radio resource control (RRC) connection reject message with a first deprioritisation request indicating at least one first carrier frequency to be the lowest priority frequency, from a first public land mobile network (PLMN) of the wireless communication system, and determining the at least one first carrier frequency to be the lowest priority frequency only when the communication device selects or registers to the first PLMN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
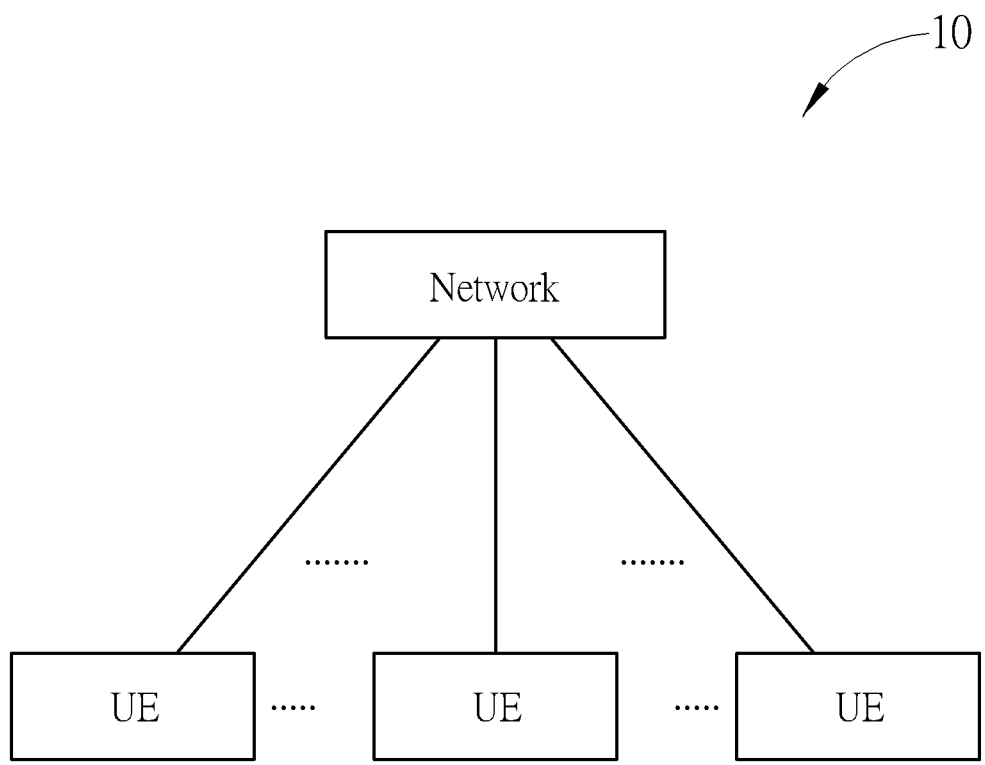
FIG. 1 illustrates a schematic diagram of an exemplary wireless communication system.

Please refer to FIG. 1, which is a schematic diagram of a wireless communication system 10. The wireless communication system 10 is a Long-Term Evolution (LTE) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
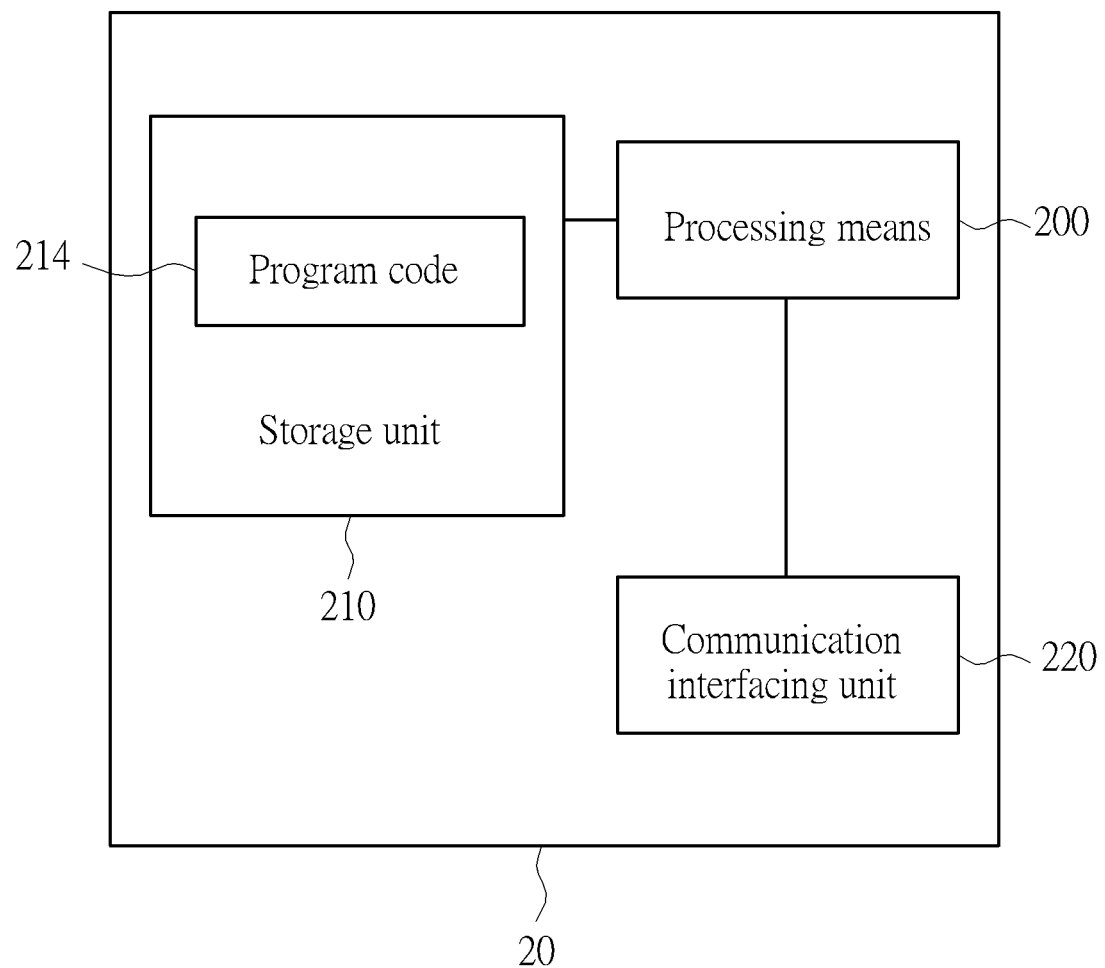
FIG. 2 illustrates a schematic diagram of an exemplary communication device.

FIG. 2 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
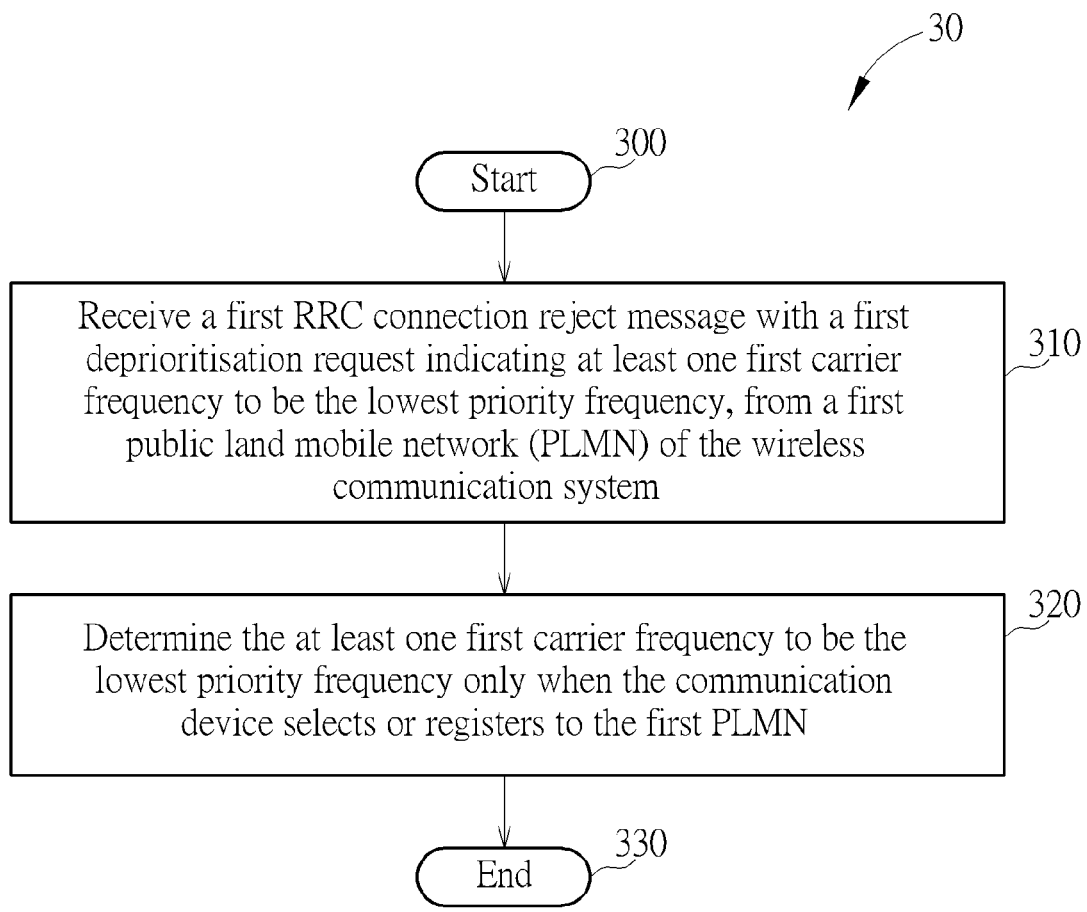
FIG. 3 is a flowchart of an exemplary process according to the present disclosure.

Please refer to FIG. 3, which is a flowchart of a process 30 according to an example of the present disclosure. The process 30 is utilized in the communication device 20 (i.e. a UE) for handling frequency de-prioritization. The process 30 may be compiled into a program code 214 to be stored in the storage unit 210, and may include the following steps:

Step 300: Start.

Step 310: Receive a first RRC connection reject message with a first deprioritisation request indicating at least one first carrier frequency to be the lowest priority frequency, from a first public land mobile network (PLMN) of the wireless communication system.

Step 320: Determine the at least one first carrier frequency to be the lowest priority frequency only when the communication device selects or registers to the first PLMN.

Step 330: End.

According to the process 30, in Step 310, the UE receives a first RRC connection reject message including a first deprioritisation request from a first PLMN, and the first deprioritisation request indicates at least one first carrier frequency to be the lowest priority frequency. The first deprioritisation request can be a parameter, deprioritisation-Req, in current 3GPP specification. In Step 320, the UE considers the at least one first carrier frequency indicated by the first deprioritisation request to be the lowest priority frequency for cell reselection only when the UE selects or registers to the first PLMN. In other words, when the UE selects or registers to a second PLMN, after a previous first PLMN, the UE does not consider the at least one first carrier frequency indicated by the first deprioritisation request included in the first RRC connection reject message to be the lowest priority frequency. The at least one first carrier frequency can be a currently used carrier frequency or all frequencies of E-UTRA.

Take an example based on the process 30. A UE receives a first RRC connection reject message with a first deprioritisation request indicating a currently used carrier frequency or all frequencies of E-UTRA to be the lowest priority frequency irrespective of camped RAT, from a first PLMN (as the original PLMN) providing LTE service. The UE considers the carrier frequency or all the frequencies of E-UTRA to be the lowest priority frequency irrespective of camped RAT only when the UE selects or registers to the first PLMN. When the UE leaves the first PLMN providing LTE service and selects or registers to the second PLMN (as the new PLMN) also providing LTE service, the UE which is currently in the second PLMN does not consider the carrier frequency or all the frequencies of E-UTRA with respect to LTE service to be the lowest priority frequency. Instead, the UE considers the priorities of the carrier frequency or all the frequencies of E-UTRA according to configuration received from a broadcast message received in the second PLMN (e.g. cell reselection priority information broadcast in the system information in the second PLMN).

In addition, the UE stores the at least one first carrier frequency indicated by the first deprioritisation request when the UE receives the first deprioritisation request. In an embodiment, when the UE leaves the first PLMN and selects or registers to the second PLMN, the UE may delete or clear the at least one first carrier frequency which is stored. Alternatively, the UE may store the at least one first carrier frequency, for each PLMN. For example, the UE still keeps the at least one first carrier frequency for the first PLMN when the UE leaves the first PLMN and selects or registers to the second PLMN. When the UE stays in the second PLMN receives a second RRC connection reject message containing a second deprioritisation request indicating at least one second carrier frequency from the second PLMN, the UE stores the at least one second carrier frequency. In a word, the UE stores at least one carrier frequency indicated by the deprioritisation request, for each PLMN.

With abovementioned manner, the UE stores the at least one second carrier frequency indicated by the second deprioritisation request, and considers the at least one second carrier frequency to be the lowest priority frequency irrespective of camped RAT, only when the UE selects or registers to the second PLMN.

Moreover, when the first RRC connection reject message contains a first deprioritization timer value, the UE starts a first timer with the first deprioritization timer value. The first timer can be t325 in 3GPP specification. When the UE selects or registers to the first PLMN, the UE considers only the at least one first carrier frequency to be the lowest priority frequency irrespective of camped RAT while the first timer t325 is running.

In an embodiment, the UE stops the first timer t325 when the UE selects or registers to the second PLMN. Alternatively, the UE keeps the first timer t325 running when the UE selects or registers to the second PLMN and, as a result, when the UE selects back to the first PLMN, the UE considers the at least one first carrier frequency to be the lowest priority frequency while the first timer t325 is running irrespective of camped RAT.

In other embodiment, when the UE is able to store the at least one carrier frequency for each PLMN and the UE staying in the second PLMN receives a second RRC connection reject message containing a second deprioritisation request indicating at least one second carrier frequency from the second PLMN, the UE keeps the at least one first carrier frequency for the first PLMN and keeps the first timer t325 running. In addition, when the second RRC connection reject message contains a second deprioritization timer value, the UE starts a second timer t325 with the second deprioritization timer value. That is, the UE maintains timer t325 running for each PLMN. With abovementioned manner, when the UE selects or registers to the second PLMN, the UE considers only the at least one second carrier frequency to be the lowest priority frequency irrespective of camped RAT while the second timer t325 is running.

Note that, if the UE selects or registers to a second PLMN, and the second PLMN is an equivalent PLMN of the first PLMN (i.e. the second PLMN is in an equivalent PLMN list) or the second PLMN and the first PLMN are owned by the same operator, the UE may consider the at least one first carrier frequency to be the lowest priority frequency irrespective of camped RAT when the UE stays in the second PLMN.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, a method of handling frequency de-prioritization is provided. The UE considers the at least one carrier frequency indicated in the deprioritisation request of the RRC connection reject message received from the first PLMN to be the lowest priority frequency for cell reselection only when the UE selects or registers to the first PLMN. Thus, when the UE selects or registers to a second PLMN, the UE does not apply the frequency priority configuration according to the first PLMN, so as to avoid cell reselection delay, which may cause that the UE can not timely obtain the communication service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling frequency de-prioritization, for a communication device in a wireless communication system, comprising:
   receiving a first Radio resource control (RRC) connection reject message with a first deprioritisation request indicating at least one first carrier frequency to be deprioritized for cell reselection, from a first public land mobile network (PLMN) of the wireless communication system;
   determining the at least one first carrier frequency to be deprioritized for cell reselection according to the first deprioritisation request when the communication device selects or registers to the first PLMN; and
   not determining the at least one first carrier frequency to be deprioritized for cell reselection according to the first deprioritisation request, when the communication device leaves the first PLMN and selects or registers to a second PLMN;
   wherein the second PLMN is not an equivalent PLMN of the first PLMN or the second PLMN and the first PLMN are not owned by a same operator.

2. The method of claim 1, further comprising:
   when the communication devices leaves the first PLMN and selects or registers to the second PLMN of the wireless communication system, determining a priority for the at least one first carrier frequency according to a configuration received from the second PLMN.

3. The method of claim 1, further comprising:
   storing the at least one first carrier frequency after receive the first RRC connection reject message; and
   deleting or clearing the at least one first carrier frequency when the communication device leaves the first PLMN and selects or registers to the second PLMN of the wireless communication system.

4. The method of claim 1, wherein determining the at least one first carrier frequency to be the deprioritized when the communication device selects or registers to the first PLMN comprises:
   determining the at least one first carrier frequency to be deprioritized for cell reselection when the communication device selects or registers from the second PLMN to the first PLMN.

5. The method of claim 1, further comprising:
   starting a first timer with a first deprioritization timer value in the first RRC connection reject message.

6. The method of claim 5, wherein the step of determining the at least one first carrier frequency to be deprioritized when the communication device selects or registers to the first PLMN comprises:
   determining the at least one first carrier frequency to be deprioritized when the communication device selects or registers to the first PLMN and the first timer is running.

7. The method of claim 5, further comprising:
   stopping the first timer when the communication device leaves the first PLMN and selects or registers to the second PLMN of the wireless communication system.

8. The method of claim 5, further comprising:
   keeping the at least one first carrier frequency and the first timer running for the first PLMN when the communication device leaves the first PLMN and selects or registers to the second PLMN of the wireless communication system.

9. The method of claim 8, wherein the step of determining the at least one first carrier frequency to be deprioritized for cell reselection when the communication device selects or registers to the first PLMN comprises:
   determining the at least one first carrier frequency to be deprioritized for cell reselection when the communication device selects or registers from the second PLMN to the first PLMN and the first timer is running.

10. The method of claim 1, further comprising:
    receiving a second RRC connection reject message with a second deprioritisation request indicating at least one second carrier frequency to be deprioritized for cell reselection from the second PLMN;
    storing the at least one second carrier frequency after receive the second RRC connection reject message; and
    determining the at least one second carrier frequency to be deprioritized for cell reselection when the communication device selects or registers to the second PLMN.

11. The method of claim 10, further comprising:
    starting a second timer with a second timer value in the second RRC connection reject message; and
    keeping the second timer running for the second PLMN.

12. A communication device of a wireless communication system for handling frequency de-prioritization, comprising:
    a storage device for storing program code corresponding to a process; and
    a processor coupled to the storage device, for processing the program code to execute the process;
    wherein the process comprises:

receiving a first Radio resource control (RRC) connection reject message with a first deprioritisation request indicating at least one first carrier frequency to be deprioritized for cell reselection, from a first public land mobile network (PLMN) of the wireless communication system;

determining the at least one first carrier frequency to be deprioritized for cell reselection according to the first deprioritisation request when the communication device selects or registers to the first PLMN; and not determining the at least one first carrier frequency to be deprioritized for cell reselection according to the first deprioritisation request, when the communication device leaves the first PLMN and selects or registers to a second PLMN;

wherein the second PLMN is not an equivalent PLMN of the first PLMN or the second PLMN and the first PLMN are not owned by a same operator.

13. The communication device of claim 12, wherein the process further comprises:

when the communication devices leaves the first PLMN and selects or registers to the second PLMN of the wireless communication system, determining a priority for the at least one first carrier frequency according to a configuration received from the second PLMN.

14. The communication device of claim 12, wherein the process further comprises:

storing the at least one first carrier frequency after receive the first RRC connection reject message; and deleting or clearing the at least one first carrier frequency when the communication device leaves the first PLMN and selects or registers to the second PLMN of the wireless communication system.

15. The communication device of claim 12, wherein the process further comprises:

leaving the first PLMN and selecting or registering to the second PLMN of the wireless communication system; and wherein the step of determining the at least one first carrier frequency to be deprioritized for cell reselection when the communication device selects or registers to the first PLMN comprises:

determining the at least one first carrier frequency to be deprioritized for cell reselection when the communication device selects or registers from the second PLMN to the first PLMN.

16. The communication device of claim 15, wherein the process further comprises:

starting a first timer with a first deprioritization timer value in the first RRC connection reject message.

17. The communication device of claim 15, wherein the step of determining the at least one first carrier frequency to be deprioritized when the communication device selects or registers to the first PLMN comprises:

determining the at least one first carrier frequency to be deprioritized for cell reselection when the communication device selects or registers to the first PLMN and the first timer is running.

18. The communication device of claim 15, wherein the process further comprises:

stopping the first timer when the communication device leaves the first PLMN and selects or registers to the second PLMN of the wireless communication system.

* * * * *